(12) United States Patent
Tajima

(10) Patent No.: US 6,191,881 B1
(45) Date of Patent: Feb. 20, 2001

(54) VARIABLE FOCAL LENGTH LENS PANEL AND FABRICATING THE SAME

(75) Inventor: Eiichi Tajima, Iruma (JP)

(73) Assignee: Citizen Watch Co., Ltd., Tokyo (JP)

( * ) Notice: Under 35 U.S.C. 154(b), the term of this patent shall be extended for 0 days.

(21) Appl. No.: 09/336,696

(22) Filed: Jun. 21, 1999

(30) Foreign Application Priority Data

Jun. 22, 1998 (JP) .................................. 10-174376

(51) Int. Cl.[7] ...................................... G02F 1/03
(52) U.S. Cl. ........................... 359/254; 349/200; 349/77
(58) Field of Search .................. 359/251–256, 359/319, 666; 349/77, 200

(56) References Cited

U.S. PATENT DOCUMENTS 5,071,229 * 12/1991 Oaki et al. ............................. 350/53
5,150,234 * 9/1992 Takahashi et al. ..................... 359/65

FOREIGN PATENT DOCUMENTS 3-2840    1/1991  (JP) .
4-240817  8/1992  (JP) .

* cited by examiner

Primary Examiner—Scott J. Sugarman
Assistant Examiner—Tim Thompson
(74) Attorney, Agent, or Firm—Armstrong, Westerman, Hattori, McLeland & Naughton

(57) ABSTRACT

There are provided a circular transparent electrode provided on a first substrate at the center thereof, a plurality of annular transparent electrodes which are disposed outside the circular transparent electrode concentrically and narrowed in width and interval as they are directed outward, extension electrodes which extend crosswise outward from the center to an external terminal electrode, and an alignment layer on these electrodes. There are also provided a transparent electrode on an entire surface of a second substrate, and an alignment layer on the transparent electrode, wherein the first and second alignment layers are subjected to a parallel aligning treatment. The first substrate and the second substrate are bonded to each other while keeping a given internal by gap members disposed outside the annular transparent electrodes, and a nematic liquid crystal is sealed in a gap between the first substrate and the second substrate.

10 Claims, 6 Drawing Sheets

VARIABLE FOCAL LENGTH LENS PANEL AND FABRICATING THE SAME

BACKGROUND OF THE INVENTION

1. Field of the Invention

The invention relates to a variable focal length lens panel and fabricating the same wherein the variable focal length lens panel can be used as a lens, for example, for an optical pickup used both in a compact disc (CD) and a digital video disc (DVD) in an optical disc drive.

2. Description of the Related Art

There has been conventionally developed a liquid crystal lens capable of varying a focal length by an applied voltage, which is, for example, disclosed in Japanese Patent Laid-Open Publication No. H4-240817.

As shown in FIG. 9, a variable focal length lens disclosed in this publication has such structure that 320×220 pixels are arranged in a lattice shape by transparent electrodes in a display area 41 which is recorded as a phase type Fresnel zone plate 42 of a liquid crystal space optical modulator 40, and ECB (electrically controlled birefringence) mode liquid crystal is sealed in the display area 41.

The liquid crystal space optional modulator 40 has a light wave modulation characteristic such that when a voltage is applied to the transparent electrodes, laser beams undergo continuous phase modulation in the range of 0 to $2\pi$. At the time of such phase variation, by applying a voltage signal Vs that effects every pixel with a phase modulation corresponding to the spatial coordinates thereof, laser beams 43 which incident on the liquid crystal spatial optional modulator 40 undergo a phase modulation by respective pixels, and concentrated on a focal point Fa on the optical axis as shown in FIG. 10. Further, if a different voltage signal Vs is applied, the light-concentrating position of the laser beams 43 can be moved to a point Fb on the optical axis.

However, the publication set forth above merely discloses a theoretical construction, it does not disclose concrete shapes and constructions of the respective transparent electrodes serving as the variable focal length lens and does not disclose the explanation of materials in the embodiment, hence it is not practicable.

A liquid crystal lens is also disclosed in Japanese patent Laid-Open Publication No. H3-2840. Briefly explaining this liquid crystal lens, it comprises a liquid crystal, a control electrode for applying a voltage to the liquid crystal, and a fixed electrode, wherein the control electrode is composed of circular or concentric ring-shaped transparent electrode bands 47 and insulating bands 46 for insulating between the transparent electrode bands 47, as shown in FIG. 11. Respective transparent electrode bands 47 are independently wired.

Polarizers may be disposed at both sides of the liquid crystal panel. If polarizers are not disposed, when a voltage is applied to the transparent electrode bands 47, the liquid crystal panel turns the direction of polarization of incident light 90° while the incident light passes thereby in the areas where the transparent electrode bands exist, and permits incident light to pass through as it is in the other areas.

Accordingly, light beams which emerge out from the liquid crystal lens can form images independently without interfering with one another on the same point, wherein the focal length thereof is varied by a voltage applied to the transparent electrode bands 47.

However, practicable concrete shapes and materials are not disclosed, and a method of fabricating the liquid crystal lens is indistinct, and hence the liquid crystal lens shown in this publication has not been put into operation.

As mentioned above, the conventionally proposed variable focal length lenses are theoretical or principled and do not specify practicable concrete shapes and constructions, and methods of fabricating the same are not disclosed, so that they have not been put to practical use.

SUMMARY OF THE INVENTION

It is therefore an object of the invention to solve the problems described above and to provide a variable focal length lens panel which is practicable for a lens used in an optical pickup of an optical disc drive, and a method of fabricating the variable focal length lens panel at low cost.

To achieve the above objects, the variable focal length lens panel according to the invention is structured as follows.

The variable focal length lens panel comprises a transparent first substrate and a transparent second substrate, a circular transparent electrode provided on the first substrate at the center thereof, a plurality of annular transparent electrodes which are disposed outside the circular transparent electrode concentrically and narrowed in width and interval as they are directed outward, extension electrodes which extend crosswise outward from the circular transparent electrode across the plurality of annular transparent electrodes, an external terminal electrode disposed at a portion close to a periphery of the first substrate so as to connect respective outer ends of the extension electrodes with one another, and a first alignment layer provided at least on an area where the circular transparent electrode and the annular transparent electrodes are formed.

Further, a transparent electrode is provided on an entire surface of the second substrate, and a second alignment layer is provided on the transparent electrode, wherein an alignment direction of the first alignment layer and that of the second alignment layer are parallel with each other.

The first substrate and the second substrate are kept at a given interval with the transparent electrodes thereon facing each other by a plurality of gap members provided on an area outside an outermost electrode of the annular transparent, and the substrates are bonded to each other by a seal member provided on the external terminal electrode, and a nematic liquid crystal is sealed in a gap between the first substrate and the second substrate.

With such a construction, it is possible to vary the focal length with high performance.

Further, with such a construction the gap members are not dispersed in the concentric annular transparent electrodes, the inferior alignment caused by the passing of the diffracted light through the periphery of the gap members is reduced, thereby varying the focal length with high performance.

Further, it is preferable to provide a seal member having an aperture at a part thereof annularly between the first and second substrates so as to surround the outer periphery of an outermost electrode of the annular transparent electrodes.

It is preferable to set a pretilt angle formed on the surfaces of the first and second alignment layers is in the range of 1.0° to 2.5°.

Further, the nematic liquid crystal sealed in the gap between the first substrate and the second substrate is not doped with a chiral material.

Still further, if there is established a relation of $\Delta nd=(\lambda/2)+n\lambda$ (n is 0 or a positive integer) between a value $\Delta nd$ which is a product of a cell gap d formed between the first substrate and the second substrate and a birefringence $\Delta n$ of the nematic liquid crystal sealed between the first substrate and the second substrate and a wavelength λ of laser beams to be used, light can be efficiently utilized.

The method of fabricating a variable focal length lens panel according to the invention has following steps.

(1) a step of providing a circular transparent electrode on a transparent first substrate at the center thereof, a plurality of annular transparent electrodes which are disposed outside the circular transparent electrode concentrically and narrowed in width and interval as they are directed outward, extension electrodes which extend crosswise outward from the circular transparent electrode across the plurality of annular transparent electrodes, and an external terminal electrode disposed at a portion close to the periphery of the first substrate so as to connect respective outer ends of the extension electrodes with one another;

(2) a step of providing a first alignment layer at least on an area of the first substrate where the circular transparent electrode and the annular transparent electrodes are provided, wherein the first aligning layer is subjected to an aligning treatment.

(3) a step of providing a transparent electrode on an entire surface of the second substrate and a second alignment layer on the transparent electrode, wherein the second alignment layer is subjected to an aligning treatment in such a manner that the alignment direction is parallel with that of the first alignment layer.

(4) a step of dispersing gap members on an area outside an outermost electrode of the annular transparent electrode provided on the first substrate.

(5) a step of overlapping the first and second substrates with each other by way of the gap members with the transparent electrodes thereon facing each other.

(6) a step of sealing a nematic liquid crystal in a gap between the first and second substrates.

In the method of fabricating a variable focal length lens panel set forth above, it is preferable to form the circular transparent electrode, the annular transparent electrodes, the extension electrodes and the external terminal electrode for a plurality of lens panels on one piece of the first substrate, and also form a first seal pattern so as to surround the outer periphery of the outermost electrode of the annular transparent electrodes for each lens panel, a second seal pattern on the external terminal electrode for each lens panel, and a third seal pattern so as to surround all lens panel forming areas, wherein the first, second and third seal patterns have a liquid crystal pouring port respectively.

With such an arrangement, liquid crystal for plural lens panels can be poured at a time from the liquid crystal pouring port of the third seal pattern, then the first and second substrates are cut to sizes of respective lens panels, thereby fabricating the variable focal length lens panel at low cost.

It is preferable that a pretilt angle formed on the surfaces of the first and second alignment layers is in the range of 1.0° to 2.5° by the aligning treatment of the first and second aligning layers.

In the step of sealing the nematic liquid crystal in the gap between the first substrate and the second substrate, it is preferable that the nematic liquid crystal is not doped with a chiral material.

It is preferable to select a cell gap d formed between the first substrate and the second substrate and a birefringence Δn of the nematic liquid crystal sealed between the first substrate and the second substrate so as to establish a relation of $\Delta nd=(\lambda/2)+n\lambda$ (n is 0 or a positive integer) between a value Δnd which is a product of the cell gap d and the birefringence Δn and a wavelength λ of laser beams to be used.

The above and other objects, features and advantages of the invention will be apparent from the following detailed description which is to be read in conjunction with the accompanying drawings.

DETAILED DESCRIPTION OF THE PREFERRED EMBODIMENT

A variable focal length lens panel and fabricating the same according to a preferred embodiment of the invention are now described in detail hereinafter, referring to figures.

The construction of the variable focal length lens panel according to the preferred embodiment of the invention is first described with reference to FIGS. 1 and 2.

Figure 1:
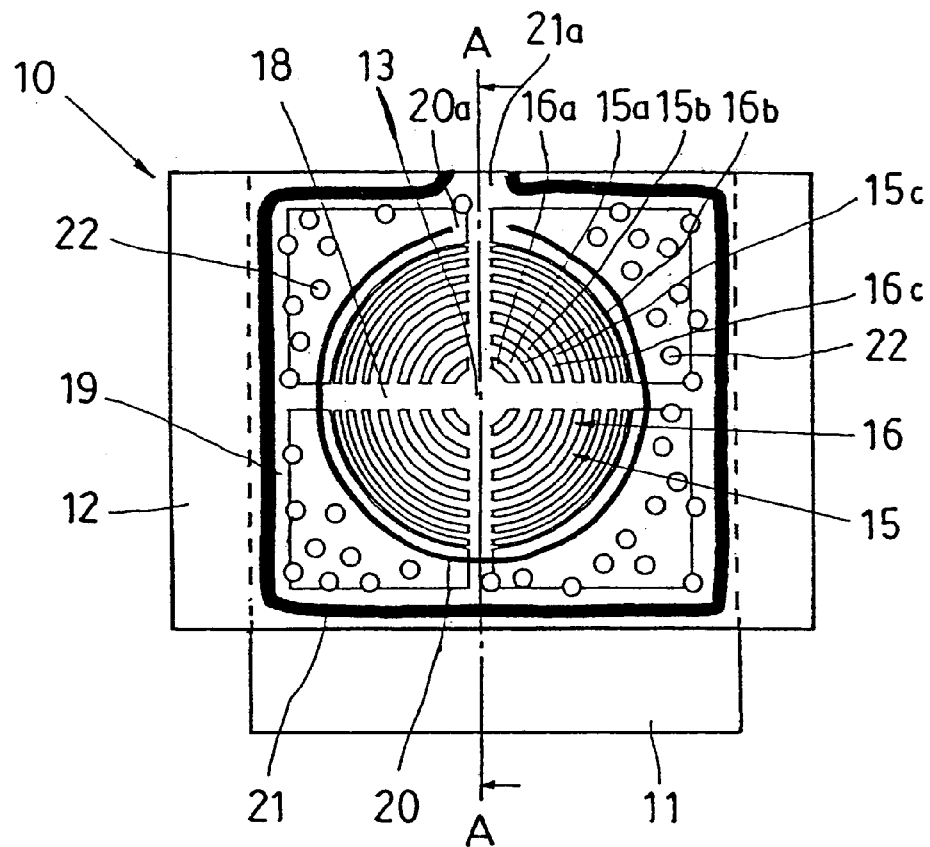
FIG. 1 is a perspective view of a variable focal length lens panel as viewed from a laser beam illumination direction according to a preferred embodiment of the invention.

FIG. 1 is a perspective of the variable focal length lens panel as viewed from a laser beam illumination direction wherein electrodes on a first substrate positioned at the back of a transparent second substrate are seen therethrough. FIG. 2 is a typical sectional view of the variable focal length lens panel taken along the line A—A in FIG. 1, wherein a diameter of a cell gap and diameters of gap members are extensively enlarged.

Figure 2:
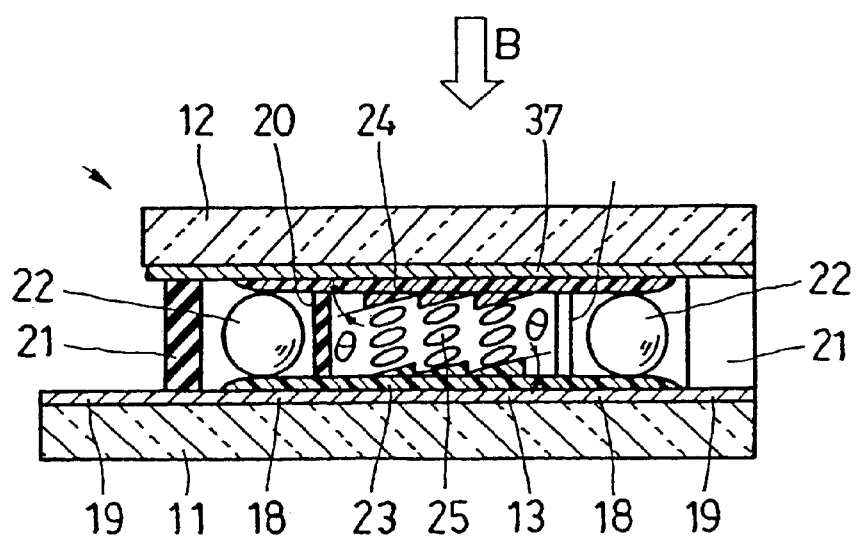
FIG. 2 is a typical sectional view of the variable focal length lens panel taken along the line A—A in FIG. 1.

A variable focal length lens panel 10 shown in FIGS. 1 and 2 includes a first substrate 11 and a second substrate 12 respectively formed of a transparent glass substrate.

As shown in FIG. 1, there are provided on the first substrate 11 a circular transparent electrode 13 at the center thereof, a plurality of annular transparent electrodes 15 which are disposed outside the circular transparent electrode 13 concentrically and narrowed in widths and intervals (spaces 16) as they are directed outward, extension electrodes 18 which extend crosswise outward from the circular transparent electrode 13 across the plurality of annular transparent electrodes 15, and an external terminal electrode 19 which is disposed at the portion close to the periphery of the first substrate 11 so as to connect the respective outer ends of the extension electrodes 18 with each other.

A first alignment layer 23 is provided at least on an area of the first substrate 11 where the circular transparent electrode 13 and the annular transparent electrodes 15 are formed.

There is provided a transparent electrode 37 on the entire surface of the second substrate 12, and a second alignment layer 24 is provided on the transparent electrode 37. The alignment direction of the first alignment layer 23 and that of the second alignment layer 24 are parallel with each other as exaggerated in FIG. 2 for purpose of illustration. This is referred to as "parallel alignment".

The first substrate 11 and the second substrate 12 having the construction as set forth above are arranged in parallel with each other while the circular transparent electrode 13, the annular transparent electrodes 15, and the transparent electrode 37 are opposed to one another. The first substrate 11 and the second substrate 12 are kept at a given interval by a plurality of gap members 22 provided on an area outside the outermost electrode of the annular transparent electrodes 15 (in FIG. 2, a cell gap which is an interval between the first substrate 11 and the second substrate 12 and the diameters of the gap members 22 are shown by extensively enlarging them), and they are bonded to each other by a seal member 21 provided on the external terminal electrode 19.

In this embodiment, a first seal member 20 is formed in an annular pattern so as to surround the outer periphery of the outermost electrode of the annular transparent electrodes 15. The seal members 20 and 21 have liquid crystal pouring ports 20a and 21a respectively.

A nematic liquid crystal 25 is sealed in a gap between the first substrate 11 and the second substrate 12. It is preferable that the nematic liquid crystal 25 is not doped with a chiral material (having no twist characteristic). The nematic liquid crystal 25 can be used if it is doped with a small amount of chiral material.

It is preferable that a pretilt angle θ on the arrignment layers 23,24 shown in FIG. 2 is formed to be in the range of 1.0° to 2.5° by an aligning treatment of the first alignment layer 23 on the first substrate 11 and the second alignment layer 24 on the second substrate 12.

Further, it is preferable to select a cell gap d and birefringence Δn of the nematic liquid crystal so as to establish a relation of $\Delta n d = (\lambda/2) + n\lambda$ (n is 0 or a positive integer) between the value Δnd of a product of the cell gap d formed between the first substrate 11 and the second substrate 12 and the birefringence Δn of the nematic liquid crystal sealed between the first substrate 11 and the second substrate 12 and each wavelength λ of laser beams which are incident from the direction denoted by the arrow B in FIG. 2.

For example, supposing that each wavelength of the laser beams to be used is 660 nm, the cell gap d and Δn of a nematic liquid crystal (which is varied depending on the wavelength of light to pass therethrough) are selected so that the value Δnd of the product becomes 330 nm, 330+660= 990 nm, 330+660×2=1650 nm or the like.

The method of fabricating the variable focal length lens panel is next described with reference to FIGS. 1 to 6.

Transparent electrodes are formed in a film having a sheet resistance in the range of 100 to 200 $\Omega/cm^2$ on the transparent first substrate 11 shown in FIGS. 1 and 2 by a low temperature sputtering process.

Thereafter, the transparent electrodes are subjected to a patterning using a photomask prepared in advance. Since the pattern is very fine, an aligner is used.

The pattern is shaped such that a pattern of the circular transparent electrode 13 is formed at the center, then a plurality of annular transparent electrodes 15 and the spaces 16 are alternately disposed outside the circular transparent electrode 13 concentrically wherein the widths of the annular transparent electrodes 15 and spaces 16 are narrowed by progression as they are directed outward.

Further, there is provided a pattern of the extension electrodes 18 extending crosswise outward so as to cross with one another at the circular transparent electrode 13 in order to connect the respective annular transparent electrodes 15 with one another, and is also provided a pattern of the square frame shaped external terminal electrode which is disposed at the portion close to the periphery of the first substrate 11 so as to connect the respective outer ends of the extension electrodes 18 with one another.

Exemplified concrete dimensions, the circular transparent electrode 13 is formed with a radius of 304 μm, and a first space 16a having a width of 63 μm is formed outside the circular transparent electrode 13, then a first annular transparent electrode 15a is formed from the position of the radius of 215 μm with a width of 48 μm.

Then, a second space 16b having a width of 41 μm is formed outside the first annular transparent electrode 15a, and a second annular transparent electrode 15b is formed from the position of a radius of 304 μm with a width of 36 μm.

A third space 16c having a width of 32 μm is formed outside the second annular transparent electrode 15b, and a third annular transparent electrode 15c is formed from the position of a radius of 372 μm with a width of 30 μm. As mentioned above, the annular transparent electrodes 15 and the spaces 16 are formed narrower in widths as they are directed outward.

In an actual pattern, the outer periphery of the outermost electrode of the annular transparent electrodes 15 has a diameter of about 3 mm and a width of about 10 μm.

Then, the extension electrodes 18 having a width of 100 μm is formed crosswise so as to be connected with all the plurality of annular transparent electrodes 15 which are concentrically formed.

Subsequently, a pattern is formed such that four outer ends of the extension electrodes 18 which are arranged crosswise are wired and connected with the external terminal electrode 19. These patterns serve as a transparent electrode pattern on the first substrate 11.

Then, a transparent electrode 37 is formed on the entire surface of the second substrate 12 while it is not subjected to a patterning.

Next, the alignment layers 23 and 24 made of polyimide, polyamic acid are respectively formed on the first substrate 11 and the second substrate 12 in a thickness of about 0.05 nm using an offset press, then they are burnt for 1 to 1.5 hours at the temperature of 200° C. to 250° C.

Figure 3:
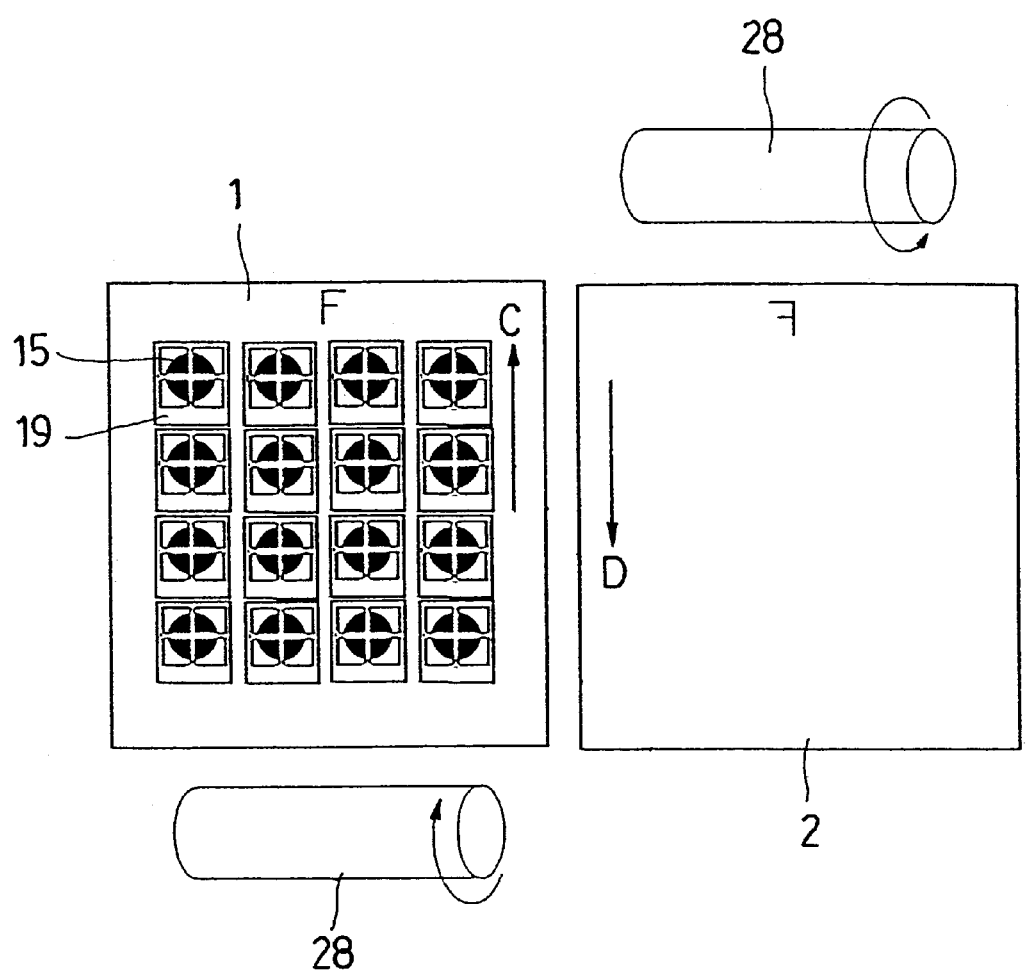
FIG. 3 is a view showing an example of aligning treatment of alignment layers in a method of fabricating a variable focal length lens panel according to the invention.

Thereafter, an aligning treatment is performed by a cotton cloth material using a rubbing process. FIG. 3 shows rotating and entering directions of rubbing roles 28 relative to electrode patterns in the case of multicavity for fabricating a plurality of lens panels at a time by original first and second substrates 1 and 2 one by one.

The entering directions of the rubbing roles 28 respectively rotating in the direction of arrows are opposed to each other such that the entering direction relative to the original first substrate 1 is directed from the lower portion thereof as shown by the arrow C in FIG. 3 while the entering direction relative to the original second substrate 2 is directed from the upper portion thereof as shown by the arrow D in FIG. 3.

Further, a pretilt angle formed on the alignment layers 23 and 24 is formed at the inclination opposite to the entering directions of the rubbing roles 28.

Further, the alignment of the liquid crystal is set to become a parallel alignment such that the original first substrate 1 and the original second substrate 2 are bonded to each other so that an F mark of the original first substrate 1 and a reversed F mark of the original second substrate 2 are overlapped with each other as shown in FIG. 3, then a nematic liquid crystal is sealed between the original first and second substrates 1 and 2.

Further, conditions are set such that a pretilt angle formed on the alignment layers 23 and 24 shown in FIG. 2 is in the range of about 1° to 2.5° at the value measured by a crystal rotation method.

Figure 4:
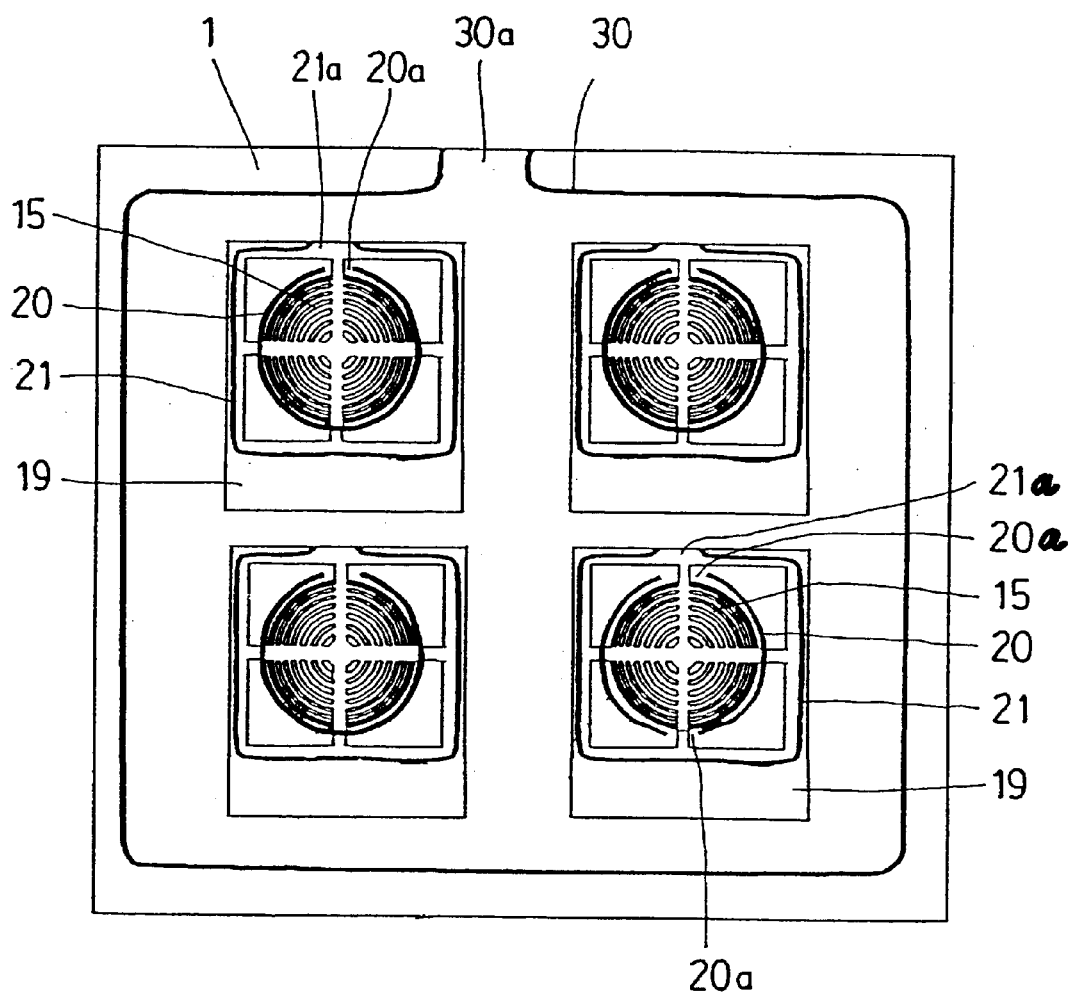
FIG. 4 is a plan view showing an example of forming a pattern of transparent electrodes for a plurality of liquid crystal lens panels and a pattern of triple structured seal members respectively on a first original substrate in the method of fabricating the variable focal length lens panel according to the invention.

Subsequently, a thermosetting type adhesive (seal member) is formed on the original first substrate 1 to have a triple layered construction as shown in FIG. 4. A pattern of the first seal member 20 for use in respective lens panels is first formed in the shape of C type or ( ) type at the periphery of the pattern of the concentric annular transparent electrodes 15, then a pattern of the second seal member 21 is formed on the external terminal electrode 19 outside the first seal member 20.

Further, there is formed a pattern of a third seal member 30 to surround the entire plurality of lens panel forming areas.

Subsequently, plastic beads or silica beads respectively having a spherical diameter in the range of 3 μm to 4 μm are dispersed on the original first substrate 1 as the gap members 22. At this time, when using the plastic beads, they are dispersed in the density of 150 pieces/mm$^2$ to 200 pieces/mm$^2$ so as to render the cell gaps uniform. When using the silica beads, they are dispersed in the density of 50 pieces/mm$^2$ to 150 pieces/mm$^2$.

Thereafter, only the gap members 22 dispersed in the first seal member 20 of the respective lens panel portions formed on the original first substrate 1 are removed.

Figure 5:
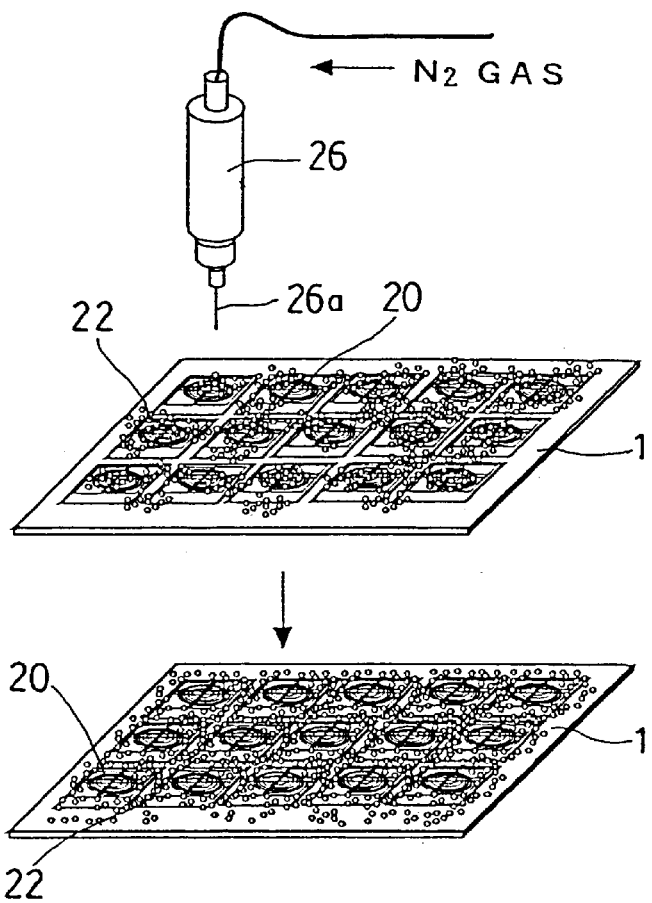
FIG. 5 is a view for explaining an example of a process of dispersing gap members in the method of fabricating the variable focal length lens panel according to the invention.

Accordingly, a dispenser 26 in the form of an injector mounted on a dispenser unit as shown in FIG. 5 is used while it is emptied and filled with air or nitrogen gas.

Further, a diameter of a needle 26a of the dispenser 26 or discharging pressure of air or nitrogen gas filled in the dispenser 26 is controlled to spray air or nitrogen gas on only the inside of the pattern of the first seal member 20, then the gap members 22 in the respective lens panel portions are blown off only in the areas where the circular transparent electrode 13 and the annular transparent electrodes 15 are formed.

Figure 6:
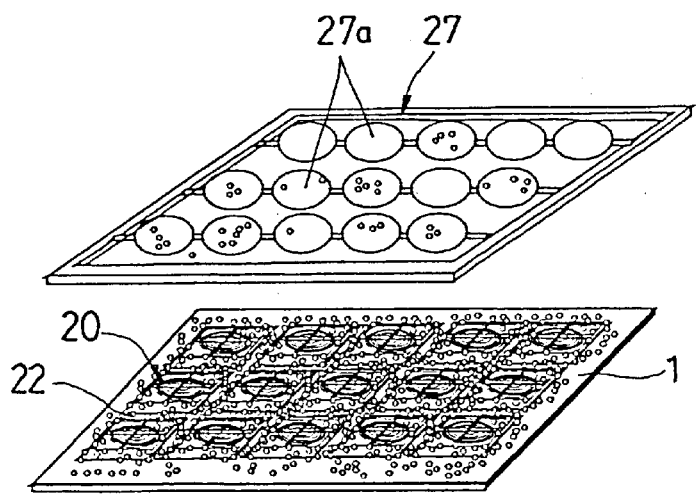
FIG. 6 is a view for explaining another example of a process of dispersing gap members in the method of fabricating the variable focal length lens panel according to the invention.

Alternatively, there is a method shown in FIG. 6 wherein a metal mask 27 having a plurality of mask portions 27a for covering and concealing only the internal portions of respective first seal members 20 on the original first substrate 1 are made of stainless steel while the alignments thereof are made uniform, thereby dispersing the gap members 22 on only the portions which are not covered with the respective mask portions 27a.

Thereafter, the original second substrate 2 and the original first substrate 1 shown in FIG. 3 are overlapped with each other. At this time, a pressure in the range of 0.4 to 1.2 kg/cm$^2$ is applied to the overlapped substrates by an air bag or the like for curing all the seal members comprising the first seal member 20 to the third seal member 30, then the overlapped substrates are burnt in a furnace for 1 to 2 hours at the temperature of 120 to 160° C.

Then, a nematic liquid crystal in which chiral material is not contained, for example, CZ-4792 (made by Chisso Petrochemical Co. Ltd.) or MJ-92665 (made by Merk Co. Ltd.) is poured into cells from a liquid crystal pouring port 30a of the third seal member 30 at a room temperature using a vacuum pouring process before the finished lens panel is cut to a predetermined size.

The nematic liquid crystal poured into the pattern of the third seal member 30 enters from the liquid crystal pouring port 21a of the second seal member 21 into the pattern of the second seal member 21 which it fills, then it enters from the liquid crystal pouring port 20a of the first seal member 20 into the pattern of the first seal member 20, namely, the lens panel portion which it fills.

Thereafter, the original first substrate 1 is cut to the size of the first substrate 11 shown in FIG. 1 at a predetermined panel size which is adapted for the shape of the pattern of the second seal members 21 of the individual lens panels. Further, the original second substrate 2 is cut to the size of the second substrate 12 shown in FIG. 1 from the opposite side.

Then, the liquid crystal pouring port 21a of the second seal member 21 is sealed by a hole sealing member, not shown, to complete the variable focal length lens panel 10 as shown in FIGS. 1 and 2.

Figure 7:
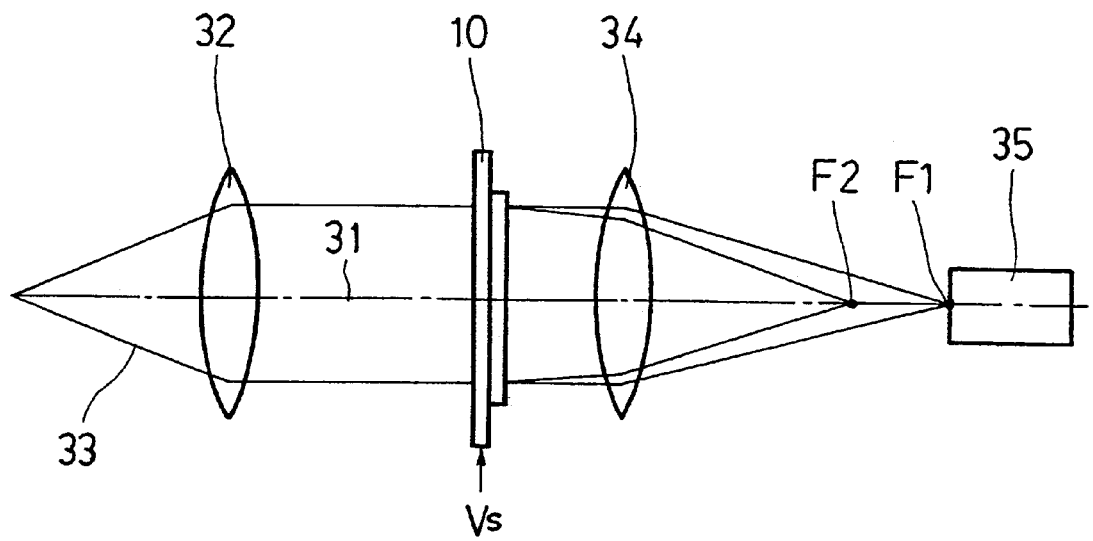
FIG. 7 is a view of an optical path showing an example of an image formation optical system using the variable focal length lens panel according to the invention.

An example of an image formation optical system using the variable focal length lens panel 10 is now described with reference to FIG. 7.

According to this optical system, a collimator lens (convex lens) 32, the variable focal length lens panel 10, a focus lens (convex lens) 34 are disposed in this order from the light source side, and light is received by an inspector 35 using a CCD.

Laser beams 33 from a laser beam source, not shown, are changed into parallel beams by the collimator lens 32, then they are incident on the focus lens 34 through the variable focal length lens panel 10, thereafter the parallel beams are concentrated and focused on the focus lens 34, which are detected by the inspector 35.

When a voltage is not applied between the transparent electrodes 13,15 and the transparent electrode 37 of the variable focal length lens panel 10, the parallel laser beams which are incident on the variable focal length lens panel 10 pass therethrough as they are, and they are incident on the focus lens 34 to be focused on the focal position F1. At this time, as shown in FIG. 8, relative light intensity detected by the inspector 35 becomes conical while centering the circular transparent electrode 13 shown in FIG. 1.

When a voltage is applied between the transparent electrodes 13,15 and the transparent electrode transparent electrode 37 of the variable focal length lens panel 10, the laser beams which are in parallel with an optical axis 31 undergo phase modulation by a liquid crystal, and they are incident on the focus lens 34 while they are in a light-concentrating state to some extent. Accordingly, a focal position on which an image is formed by the focus lens 34 is moved to F2 in front of the focal point F1. The focal position at this time is varied depending on the magnitude of a voltage to be applied to the variable focal length lens panel 10.

Figure 8:
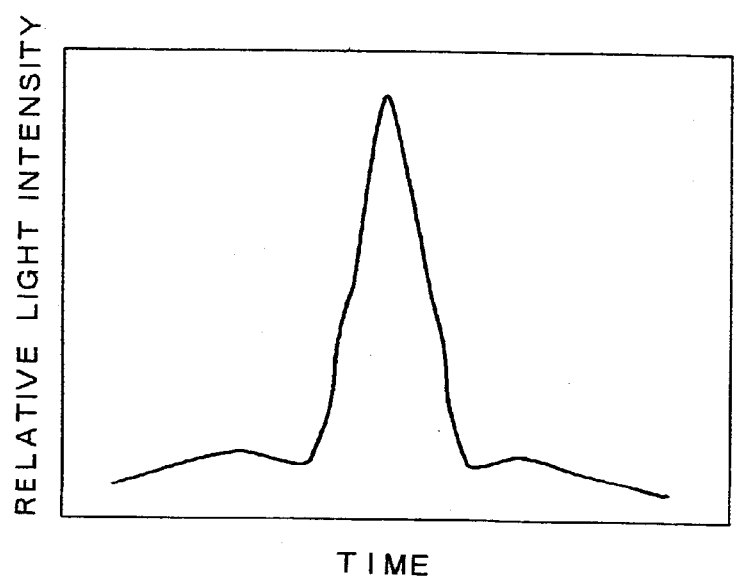
FIG. 8 is a graph showing relative light intensity in a focal plate in the optical system in FIG. 7.
Figure 9:
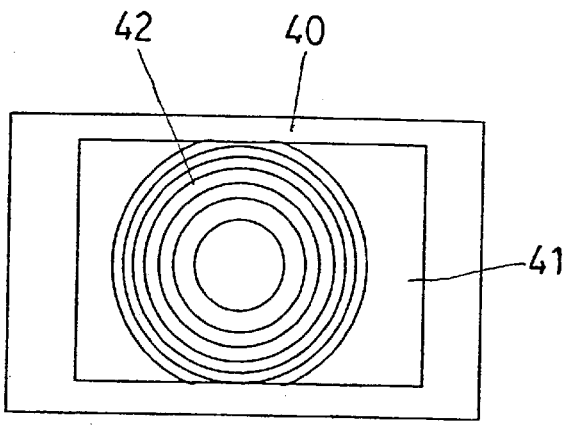
FIG. 9 is a schematic view showing an example of a conventional variable focal length lens.
Figure 10:
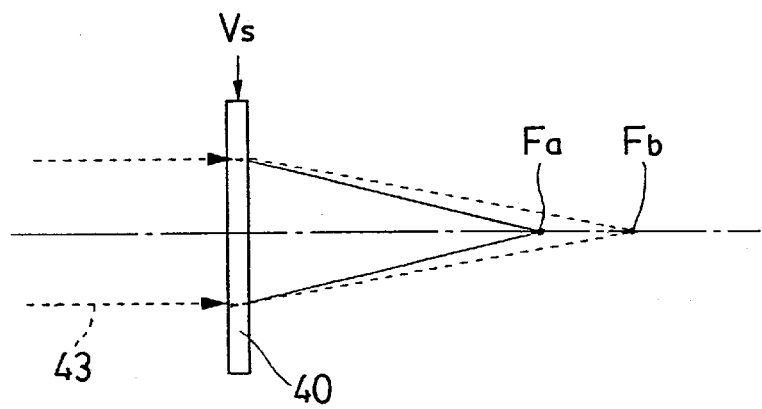
FIG. 10 is a view of an optical path showing the variation of a focal length by the variable focal length lens in FIG. 9.
Figure 11:
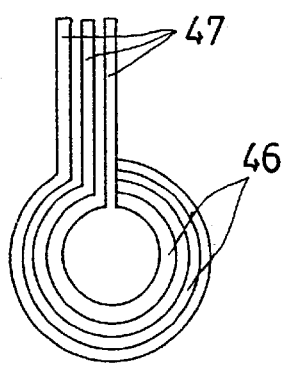
FIG. 11 is a schematic view showing another example of the shape of transparent electrodes of the conventional variable focal length lens.

At this time, as shown in FIG. 8, relative light intensity at the focal point F2 also becomes conical while centering the circular transparent electrode 13 shown in FIG. 1.

Accordingly, if an image forming optical system is employed by an optical pickup of an optical disc drive, a position of spot light for illuminating an optical disc by concentrating laser beams can be changed, whereby the same optical system can be used both in a CD and a DVD. As a result, it is not necessary to mechanically move two kinds of optical systems to changeover therebetween as made in the prior art. Accordingly, an optical pickup for use both in a CD and a DVD which is fabricated at low cost and has excellent durability can be achieved.

As mentioned above, the variable focal length lens panel of the invention is structured such that the transparent electrodes provided on one transparent substrate comprise the circular transparent electrode at the center thereof and the plurality of annular transparent electrodes which are disposed outside the circular transparent electrode concentrically with the annular spaces defined therebetween, wherein the widths of the annular transparent electrodes and the widths of intervals therebetween are narrowed by progression as they are directed outward, and the nematic liquid crystal which is subjected to a parallel aligning treatment is sealed in a gap between the transparent substrate and the transparent electrode on the entire surface of the other transparent substrate, whereby a focal length of laser beams passing through the variable focal length lens panel can be varied by a voltage applied between the transparent electrodes formed on two substrates.

Further, the gap members for keeping the interval of two substrates fixed are provided at an area other than the liquid crystal lens portion on which annular transparent electrodes are provided and are not provided at the lens panel portions, thereby eliminating diffraction and scattering of light generated at the contours of the gap members when incident laser beams are illuminated on the gap members. As a result, the amount of transmitted light of laser beam increases and the light intensity to be detected becomes stronger, thereby obtaining a lens panel with high efficiency.

Still further, when the value $\Delta nd$ of the product of the cell gap d and the birefringence $\Delta n$ of the liquid crystal is set to a half of a wavelength of laser beams (or adding the wavelength of the laser beams multiplied by a positive integer), the focal length can be varied with high efficiency.

Further, according to a method of fabricating the variable focal length lens panel of the invention, the variable focal length lens panel can be fabricated efficiently at low cost. Particularly, when a pattern of the third seal member to surround the entire respective lens panel forming areas is provided in the case of multicavity for fabricating a plurality of variable focal length lens panels at a time using common original substrates, a process of pouring liquid crystal can be simplified, thereby fabricating the variable focal length lens panels at a low cost.

What is claimed is:

1. A variable focal length lens panel comprising:
   a transparent first substrate and a transparent second substrate;
   a circular transparent electrode provided on the first substrate at the center thereof;
   a plurality of annular transparent electrodes which are disposed outside the circular transparent electrode concentrically and narrowed in width and interval as they are directed outward;
   extension electrodes which extend crosswise outward from the circular transparent electrode across the plurality of annular transparent electrodes;
   an external terminal electrode disposed at a portion close to a periphery of the first substrate so as to connect respective outer ends of the extension electrodes with one another;
   a first alignment layer provided at least on an area where the circular transparent electrode and the annular transparent electrodes are formed;
   a transparent electrode provided on an entire surface of the second substrate, and a second alignment layer provided on the transparent electrode, wherein an alignment direction of the first alignment layer and that of the second alignment layer are parallel with each other;
   wherein the first substrate and the second substrate are kept at a given interval by gap members provided on an area outside an outermost electrode of the annular transparent electrodes with the transparent electrodes thereon facing each other, and the substrates are bonded to each other by a seal member provided on the external terminal electrode; and
   a nematic liquid crystal is sealed in a gap between the first substrate and the second substrate.

2. A variable focal length lens panel according to claim 1, wherein a seal member having an aperture at a part thereof is provided annularly between the first and second substrates so as to surround the outer periphery of an outermost electrode of the annular transparent electrodes.

3. The variable focal length lens panel according to claim 1, wherein a pretilt angle formed on the surfaces of the first and second alignment layers is in the range of 1.0° to 2.5°.

4. The variable focal length lens panel according to claim 1, wherein the nematic liquid crystal sealed in the gap between the first substrate and the second substrate is not doped with a chiral material.

5. The variable focal length lens panel according to claim 1, wherein a relation of $\Delta nd=(\lambda/2)+n\lambda$ (n is 0 or a positive integer) is established between a value $\Delta nd$ which is a product of a cell gap d formed between the first substrate and the second substrate and a birefringence $\Delta n$ of the nematic liquid crystal sealed between the first substrate and the second substrate and a wavelength $\lambda$ of laser beams to be used.

6. A method of fabricating a variable focal length lens panel comprising steps of:
   providing a circular transparent electrode on a transparent first substrate at the center thereof, a plurality of annular transparent electrodes which are disposed outside the circular transparent electrode concentrically and narrowed in width and interval as they are directed outward, extension electrodes which extend crosswise outward from the circular transparent electrode across the plurality of annular transparent electrodes, and an external terminal electrode disposed at a portion close to the periphery of the first substrate so as to connect respective outer ends of the extension electrodes with one another;
   providing a first alignment layer at least on an area of the first substrate where the circular transparent electrode and the annular transparent electrodes are provided, wherein said first alignment layer is subjected to an aligning treatment;
   providing a transparent electrode on an entire surface of the second substrate and a second alignment layer on the transparent electrode, wherein said second alignment layer is subjected to an aligning treatment to set an alignment direction of that in parallel with that of the first alignment layer;

dispersing gap members on an area outside an outermost electrode of the annular transparent electrodes provided on the first substrate;

overlapping the first and second substrates with each other by way of said gap members with the transparent electrodes thereon facing each other; and sealing a nematic liquid crystal in a gap between the first and second substrates.

7. The method of fabricating a variable focal length lens panel according to claim 6, wherein the circular transparent electrode, the annular transparent electrodes, the extension electrodes and the external terminal electrode for a plurality of lens panels are formed on one piece of the first substrate, and said method further comprising:

forming a first seal pattern so as to surround the outer periphery of the outermost electrode of the annular transparent electrodes for each lens panel, a second seal pattern on the external terminal electrode for each lens panel, and a third seal pattern so as to surround all lens panel forming areas, wherein said first, second and third seal patterns have a liquid crystal pouring port respectively.

8. The method of fabricating a variable focal length lens panel according to claim 6, wherein a pretilt angle formed on the surfaces of the first and second alignment layers is in the range of 1.0° to 2.5° by said aligning treatment of said first and second alignment layers.

9. The method of fabricating a variable focal length lens panel according to claim 6, wherein in the step of sealing the nematic liquid crystal in the gap between the first substrate and the second substrate, said nematic liquid crystal is not doped with a chiral material.

10. The method of fabricating a variable focal length lens panel according to claim 6, wherein a cell gap d formed between the first substrate and the second substrate and a birefringence $\Delta n$ of the nematic liquid crystal sealed between the first substrate and the second substrate is selected so as to establish a relation of $\Delta nd=(\lambda/2)+n\lambda$ (n is 0 or a positive integer) between a value $\Delta nd$ which is a product of the cell gap d and the birefringence $\Delta n$ and a wavelength $\lambda$ of laser beams to be used.

\* \* \* \* \*